June 2, 1959
C. A. BLOMSTRAN ET AL
2,889,133
VALVE ACTUATING MECHANISM
Filed Oct. 3, 1955
3 Sheets-Sheet 1
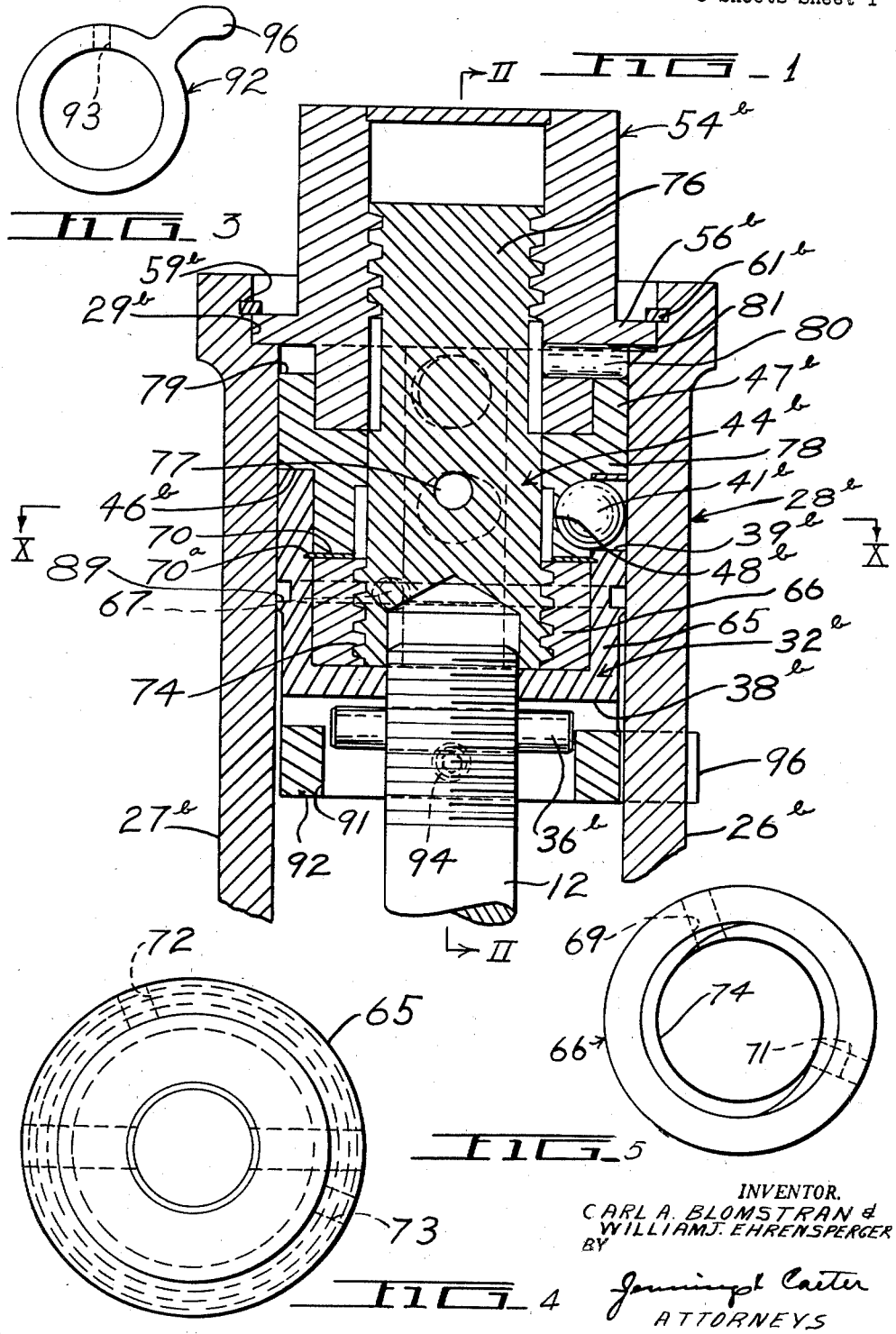
INVENTOR.
CARL A. BLOMSTRAN &
WILLIAM J. EHRENSPERGER
BY
Jennings & Carter
ATTORNEYS

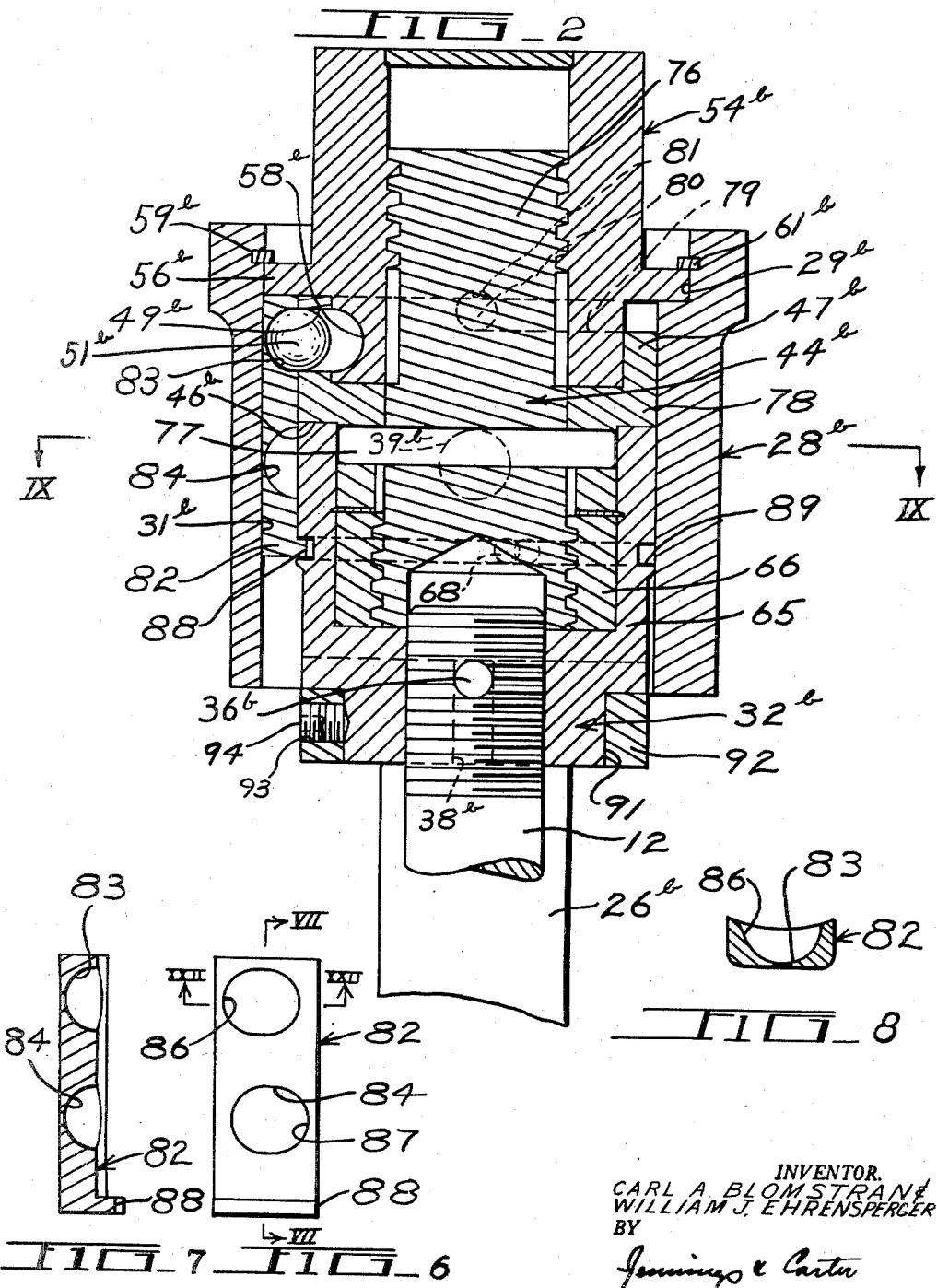

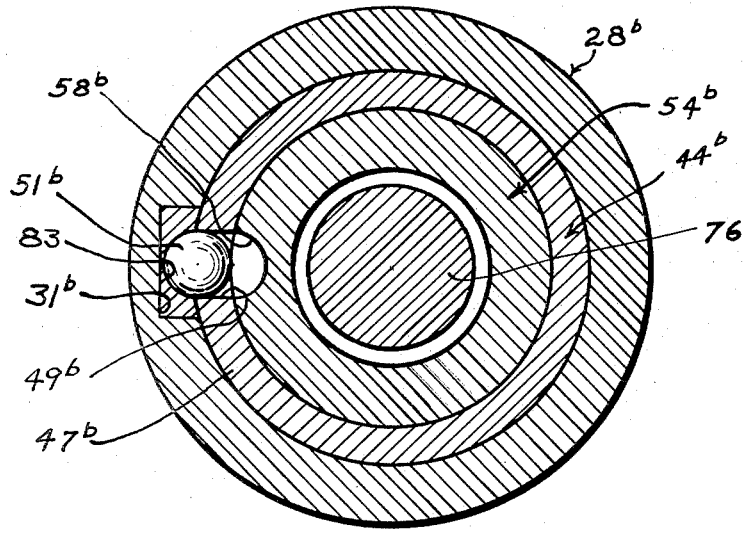
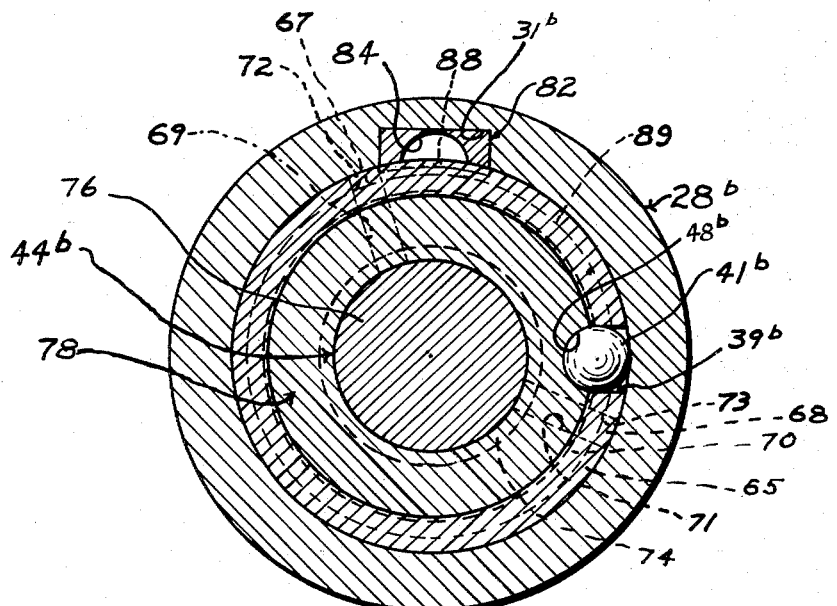

United States Patent Office 2,889,133
Patented June 2, 1959

2,889,133

VALVE ACTUATING MECHANISM

Carl A. Blomstran and William J. Ehrensperger, Birmingham, Ala., assignors to Stockham Valves & Fittings, Inc., a corporation of Delaware Application October 3, 1955, Serial No. 537,999

8 Claims. (Cl. 251—164)

This invention relates to valve actuating mechanism and is an improvement over that described and claimed in our co-pending application, Serial No. 421,246, filed April 6, 1954, and entitled Valve Actuating Mechanism.

An object of our invention is to provide valve actuating mechanism for a plug type valve which holds the plug against rotation as it is moved to and from seated position, thereby preventing rotation of the plug against its seat.

A further object of our invention is to provide valve actuating mechanism of the character designated which shall be simple of construction and operation, economical of manufacture due to a material saving in the machining of the parts thereof and which requires a minimum of maintenance to keep the same in satisfactory working order.

Briefly, our improved valve actuating mechanism embodies a cylindrical housing connected to the body of the valve being actuated. An axially extending recess is provided in the housing for receiving an elongated key member with a sliding fit. A pair of axially spaced recesses are provided in the key member for receiving index members. Inner, intermediate and outer rotatable members are mounted within the housing, the inner and intermediate rotatable sections having through openings for receiving the index members and the inner rotatable member being connected to the valve stem. Other recesses are provided in the intermediate and outer rotatable sections for receiving portions of the adjacent index members when these recesses are in register with their respective index members, whereby the index members are removed from the axially spaced recesses. Locking means is provided adjacent the outer end of the housing for holding the outer rotatable section against axial movement within the housing.

Apparatus embodying features of our invention is shown in the accompanying drawings, forming a part of this application in which:

Fig. 1 is a sectional view of the valve actuating mechanism;

Fig. 2 is a sectional view taken generally along the line II—II of Fig. 1;

Fig. 3 is a plan view, drawn to a smaller scale, showing the stop member which limits rotation of the valve stem;

Fig. 4 is a plan view of the cup shaped portion of the inner rotatable section, the threaded sleeve portion thereof being omitted for the sake of clarity;

Fig. 5 is a plan view of the sleeve portion of the inner rotatable section;

Fig. 6 is an elevational view of the key member having recesses therein for receiving the index members;

Fig. 7 is a sectional view taken along the line VII—VII of Fig. 6;

Fig. 8 is a sectional view taken along the line VIII—VIII of Fig. 6.

Fig. 9 is a sectional view taken along the line IX—IX of Fig. 2; and,

Fig. 10 is a sectional view taken along the line X—X of Fig. 1.

Referring now to the drawings for a better understanding of our invention we show a fragment of a yoke of a conventional plug type valve having outwardly extending spaced side members $26b$ and $27b$. Formed integrally with the outer ends of the side members $26b$ and $27b$ is a cylindrical housing $28b$ having an enlarged diameter portion $29b$ adjacent the outer end thereof. Threadedly connected to the outer end of the valve stem 12 is an inner rotatable section $32b$ which comprises a cup shaped member 65 having a threaded opening in the bottom thereof for receiving the stem 12 and a transverse slot $38b$ in the lower portion thereof for receiving a pin $36b$. Fitting within the cup shaped member 65 and forming a part of the inner rotatable section 32 is a sleeve member 66. Outward movement of the sleeve 66 relative to the cup-shaped member 65 is limited by a ring 70 which fits in an annular groove $70a$ in the inner wall of the member 65 and bears against the outer surface of the sleeve 66. The sleeve member 66 is also secured to the cup-shaped member 65 by means of transverse pins 67 and 68 which fit in radially extending openings 69 and 71 in the sleeve member 66 and in radially extending openings 72 and 73 in the cup-shaped member 65.

The sleeve 66 is provided with internal right hand threads 74 which are in threaded connection with an intermediate rotatable section $44b$ comprising an axially extending member 76 having external right hand threads along the innermost portion thereof and external left hand threads along the outermost portion thereof. Secured to the axially extending member 76 by means of a pin 77 and forming a part of the intermediate section $44b$ is a sleeve member 78. The outer end of the sleeve member 78 is enlarged as at $46b$ and terminates in an outwardly extending annular flange $47b$.

Connected to the outer end of the axially extending member 76 by means of left hand threads is an outer rotatable section $54b$ having an annular flange $56b$ which engages the enlarged diameter portion $29b$, as shown in Figs. 1 and 2. An annular groove $59b$ is provided in the enlarged diameter portion $29b$ for receiving a retaining ring $61b$ which prevents outward movement of the rotatable member $54b$.

The upper edge of the annular flange $47b$ is cut away as at 79 to provide a recessed portion which extends slightly more than half-way around the annular flange $47b$ as shown in Fig. 2. Fitting in the recessed portion of the annular flange $47b$ is a pin 80. The pin 80 extends through an opening 81 in the outer rotatable member $54b$ and is secured rigidly thereto.

A substantially round opening $39b$ is provided in the side wall of the cup-shaped member 65 of the inner rotatable section $32b$ for receiving an index member $41b$ which is preferably in the form of a steel ball. A recess $48b$, substantially semi-circular as viewed in cross section, is provided in the wall of the sleeve member 78 in position to receive a portion of the index member $41b$ when the intermediate section $44b$ and the inner rotatable section $32b$ shoulder as shown in Figs. 1 and 10. A substantially round opening $49b$ is provided in the annular flange $47b$ for receiving an index member $51b$ which is also preferably in the form of a steel ball. A recess $58b$ substantially semi-circular as viewed in cross section, is provided in the outer section $54b$ in a position to receive a portion of the index member $51b$ as shown in Figs. 2 and 9.

An axially extending recess $31b$ is provided in the cylindrical housing $28b$ for receiving an elongated key member 82. Axially spaced recesses 83 and 84 are provided in the key member 82 for receiving portions the index members 51b and 41b, respectively. As shown in Figs. 6 and 8, the recesses 83 and 84 are cut-away as at 86 and 87 to provide substantially 25° angular reliefs on the sides indicated to facilitate the release of the index members 51b and 41b. Projecting inwardly of the lower end of the key member 82 is a heel member 88 which slidably engages an annular groove 89 formed in the outer wall of the cup-shaped member 65.

The lower portion of the cup-shaped member 65 is reduced in diameter as at 91 for receiving an annular stop collar 92. A threaded opening 93 is provided in the stop collar 92 for receiving a set screw 94 which locks the collar 92 to the cup-shaped member 65 of the inner rotatable section 32b. A laterally extending projection 96 is provided on the stop collar 92 which engages the side members 26b and 27b to limit rotation of the inner rotatable section 32b and the valve stem 12.

The operation of our valve actuating mechanism will now be described. In Figs. 1 and 2, the valve stem 12 is shown in raised or unseated position with the valve rotated toward closed position. In this position, the pin 67 is in contact with the heel 88 of the key member 82, as shown in Figs. 1 and 10, and the projection 96 of the stop collar 92 is in contact with the side member 26b, thus limiting further rotation of the inner section 32b. To lower the valve stem 12 toward seated position, the outer rotatable member 54b is rotated clockwise whereby the intermediate section 44b is unscrewed from the outer rotatable section 54b. This relative movement of the sections 44b and 54b is accomplished due to the fact that left hand threads are employed between the intermediate sections 44b and the outer section 54b and the index member 51b is in the recess 83 and out of contact with recess 58b thus causing the key member 82 to move axially with the intermediate section 44b toward seated position. Also, at this time the index member 41b is in the recess 48b of the sleeve member 78, thus locking the intermediate and lower rotatable sections together. Accordingly, as the outer rotatable member 54b is rotated clockwise, the key member 82 slides axially in the recess 31b whereby the valve stem 12 is moved toward seated position without rotation.

To move the valve stem 12 from closed seated position to open unseated position, the outer rotatable member 54b is rotated in a counterclockwise direction causing the intermediate section 44b to screw into the outer rotatable section 54b whereby the valve stem 12 is raised without rotation. There is no rotation of the sections 44b and 32b at this time since the index member 51b is in the recess 83 and index member 41b locks sections 44b and 32b to each other. Continued counterclockwise rotation of the outer rotatable member 54b, after the same has shouldered with the intermediate member 44b and the pin 80 has engaged the end of the recessed portion 79, causes the index member 51b to leave the recess 83 and enter the recess 58b thereby locking the outer and intermediate rotatable sections to each other, whereupon with the index member 41b in recess 48b, the outer, intermediate and inner sections rotate as a unit to move the valve to open position. The 25° angular relief at 86 causes the index member 51b to leave recess 83 upon counterclockwise rotation of the outer section 54b. As the valve reaches open position, the index member 41b moves into the recess 84, thus preventing relative movement between the cylindrical housing 28b and the inner rotatable section 32b. Also, at this time the pin 68 is in contact with the heel 88 of the key member 82, and the projection 96 of the stop collar is in contact with the side member 27b. Continued counterclockwise rotation causes the intermediate section 44b to unscrew from the inner section 32b due to the fact that right hand threads are employed between the sections 44b and 32b. The valve stem is thus moved toward open seated position without rotation.

To return the valve stem 12 to unseated closed position, the rotatable section 54b is rotated in a clockwise direction causing the intermediate section 44b to thread into the inner section 32b, thus lifting the valve stem 12 without rotation until the inner and intermediate sections shoulder. At this time, the index member 41b enters the recess 48b in the sleeve member 78 due to the 25° angular relief at 87 thus permitting the rotatable section 32b, 44b and 54b to rotate as a unit toward unseated closed position, as shown in Figs. 1, 2, 9 and 10.

For the sake of clarity, Figs. 1 and 2 of the drawings show the valve stem in raised or unseated position with the valve rotated toward closed position. Accordingly, the description of the operation of the valve starts from this position of the valve. However, as is well understood in the art, the valve will normally be operated from open or closed seated position of the valve.

From the foregoing it will be seen that we have devised an improved valve actuating mechanism which is fully effective to move the valve plug to and from seated position without rotating the same against its seat. By providing an inner rotatable section in threaded connection with an intermediate rotatable section and an outer rotatable section in oppositely threaded connection with the intermediate section, together with means preventing rotation of the inner rotatable section as the valve stem is moved to and from seated position, our valve actuating mechanism is very simple of construction and readily lends itself to mass production. Furthermore, by providing an axially extending recess in the outer cylindrical housing for receiving a sliding key having axially spaced recesses therein, together with index members in the form of steel balls we have provided a substantially trouble free valve which requires a minimum of maintenance. In actual practice, our improved valve actuating mechanism has been found to be satisfactory in every respect.

While we have shown our invention in but one form, it will be obvious to those skilled in the art that it is not so limited, but is susceptible of various changes and modifications without departing from the spirit thereof, and we desire, therefore, that only such limitations shall be placed thereupon as are specifically set forth in the appended claims.

What we claim is:

1. In mechanism for actuating a valve having a body and a plug in which the plug is adapted to unseat, turn and reseat, a cylindrical housing having an axially extending recess therein, an elongated key member mounted for sliding movement within said axially extending recess, the inner surface of said key member having a first recess and a second recess therein spaced axially from each other, an inner rotatable section within and in slidable contact with said housing, means operatively connecting said key member to said inner section whereby said key member moves axially with said inner section, an outer rotatable section mounted for rotation within said housing, an intermediate rotatable section within and in slidable contact with said housing between and in oppositely threaded connection with said inner section and said outer section, said inner and intermediate sections having transverse openings therethrough, a first index member within said opening in said inner section, a second index member within said opening in said intermediate section, said first and second index members being disposed to enter respectively said first recess and said second recess in the key member when they are in register with the same to lock said inner section and said key member against relative rotation and release the intermediate section for rotation relative to said inner section while said first index member is in said first recess in the key member and to lock the intermediate section and said key member against relative rotation and release said outer section for rotation relative to said intermediate section while said second index member is in said second recess in the key member, the intermediate and outer sections having recesses therein disposed to be in register with and receive said first and second index members respectively at a selected angular position of said intermediate and inner sections relative to each other and at a selected angular position of said intermediate and outer sections relative to each other respectively, whereby said index members are removed from said first and second recesses in the key member to lock together the inner, intermediate and outer sections for rotation as a unit while both index members are thus removed from the recesses in the key member, means holding said outer section against axial movement relative to said housing, and means limiting rotation of said inner section.

2. Mechanism as defined in claim 1 in which each axially spaced recess is cut-away at one side thereof to facilitate the release of its associated index member.

3. Mechanism as defined in claim 2 in which the cut-away portion of each axially spaced recess defines a substantially 25° angular relief.

4. In mechanism for actuating a valve having a body and a plug in which the plug is adapted to unseat, turn and reseat, a cylindrical housing, an inner cup-shaped section mounted for rotation within and in slidable contact with said housing, the wall of said inner section having an opening therethrough, a first index member disposed to fit in said opening in the inner section, an intermediate section in threaded connection with said inner section and having a recess therein disposed to receive a portion of said first index member at a selected angular position of said inner section relative to said intermediate section whereby the inner and intermediate sections are locked together by said first index member to rotate as a unit, an axially extending annular flange adjacent the outer end of said intermediate section and having an opening therethrough, a second index member disposed to fit in the opening in said flange, an outer rotatable section mounted for rotation within said annular flange of the intermediate section and threadedly connected to said intermediate section oppositely from that of said inner section, said outer section having a recess therein disposed to receive a portion of said second index member at a selected angular position of said intermediate and outer sections relative to each other whereby the outer and intermediate sections are locked together by said second index member to rotate as a unit, said housing having an axially extending recess therein, an elongated key member mounted for sliding movement within said axially extending recess, the inner surface of said key member having a first recess and a second recess therein spaced axially from each other, said first recess in the key member being in position to receive a portion of said first index member when in register therewith to lock said inner section and said key member against relative rotation and release said intermediate section for rotation relative to said inner section while said first index member is in said first recess in the key member, said second recess in the key member being in position to receive a portion of said second index member when in register therewith to lock said intermediate section and said key member against relative rotation and release said outer section for rotation relative to said intermediate section while said second index member is in said second recess in the key member, said inner section having an annular groove surrounding the same, an inwardly projecting heel on the inner end of said key member fitting slidably in said groove whereby said key member moves axially with said inner section, means holding said outer rotatable section against axial movement relative to said housing, and means limiting rotation of said inner section.

5. Mechanism as defined in claim 4 in which the means limiting rotation of the inner section comprises stop means mounted on the inner rotatable section in position to engage the sides of the key, whereby rotation of the inner section is limited.

6. Mechanism as defined in claim 4 in which a stop collar is secured to the inner rotatable section with a portion of the collar projecting outwardly in position to engage a portion of the housing to limit rotation of the inner rotatable section.

7. Mechanism as defined in claim 4 in which the inner rotatable section comprises a cup-shaped member having an inner internally threaded sleeve member secured thereto and the intermediate rotatable section comprises an axially extending member having a threaded portion along its inner end in threaded contact with said threaded sleeve member and an oppositely threaded portion along the outer end thereof in threaded contact with the outer rotatable section.

8. Mechanism as defined in claim 4 in which the axially extending annular flange adjacent the outer end of the intermediate section is formed integrally with a sleeve member which is secured to the axially extending member of the intermediate section.

References Cited in the file of this patent

UNITED STATES PATENTS

| | | |
|---|---|---|
| 2,076,838 | Heggem | Apr. 13, 1937 |
| 2,139,632 | Flodin | Dec. 6, 1938 |
| 2,238,385 | Foster | Apr. 15, 1941 |
| 2,501,150 | Anderson | Mar. 21, 1950 |
| 2,711,302 | McWhorter | June 21, 1955 |